Aug. 1, 1967
F. M. MATHENY ETAL
3,333,311
APPARATUS FOR LINING PIPE INCLUDING
SPREADER LEAVES WITH ADJUSTABLY
MOUNTED SPRING MEANS
Filed June 21, 1963
2 Sheets-Sheet 1
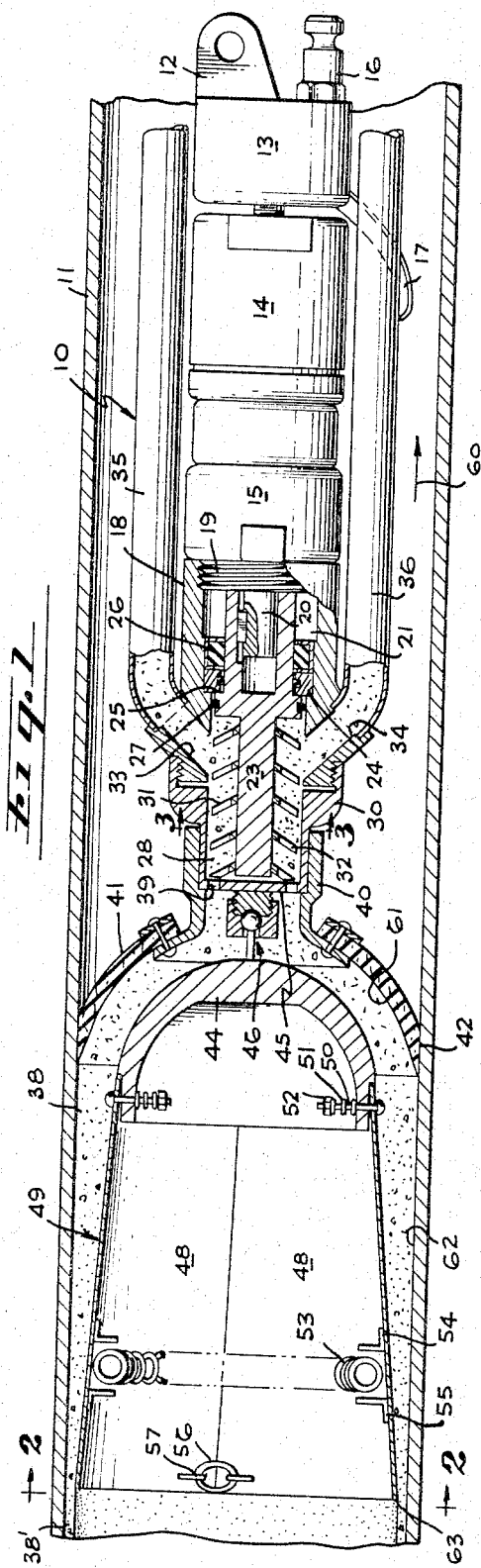
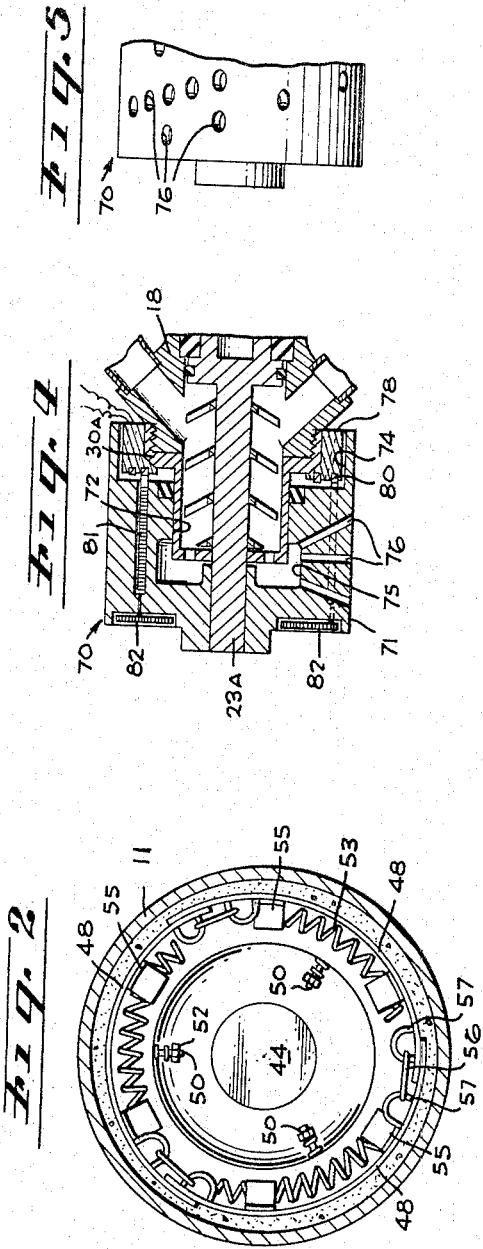
FRANCIS M. MATHENY
WILLIAM T. RANKER
INVENTORS
BY
ATTORNEYS

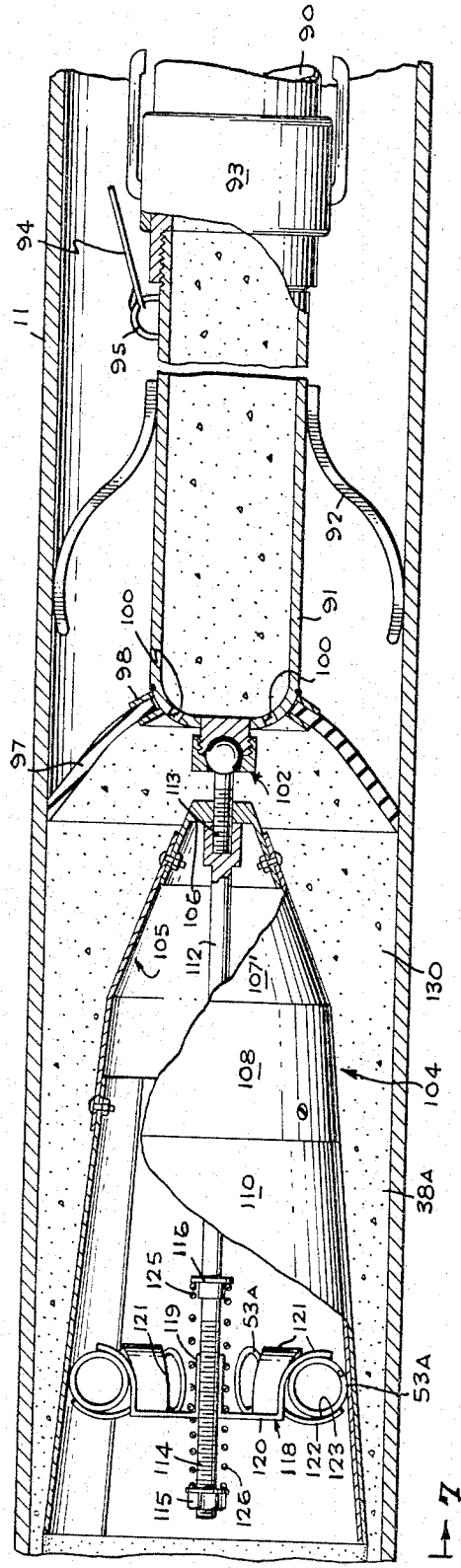

United States Patent Office 3,333,311
Patented Aug. 1, 1967

3,333,311
APPARATUS FOR LINING PIPE INCLUDING SPREADER LEAVES WITH ADJUSTABLY MOUNTED SPRING MEANS
Francis M. Matheny, Lynwood, and William T. Ranker, Norwalk, Calif., assignors to Pipe Linings, Inc., Wilmington, Calif., a corporation of California
Filed June 21, 1963, Ser. No. 289,693
3 Claims. (Cl. 25—38)

This invention has to do generally with the lining of pipelines of relatively small diameter in the approximate range of from four to twelve inches with a relatively thin lining of a coating material which is highly resistant or substantially impervious to chemical and bacterial action, and with somewhat less impervious material, such as cement mortar.

One problem in the lining of pipe in place in the ground or at a distance from the source of supply of the lining material, where such material is of a nature which hardens or sets quickly once it is mixed, has been the tendency for the material to harden or set before it is applied as a lining, and also where shutdowns or removal of the apparatus have been necessary, the material may harden in the supply hoses leading to the machine, with the consequent difficulty of cleaning out the material.

An object of the invention is to provide a novel apparatus for overcoming the above-noted difficulties wherein the material is applied substantially immediately after the final combining and mixing of the materials, and of providing such apparatus where there is no loss of material or possibility of its hardening in the hose lines leading from the source of supply to the machine.

Another object is to provide a novel lining machine which embodies means for combining and mixing two materials and applying them to the pipe wall substantially immediately thereafter.

A further object is to provide a novel lining machine for the application of material which requires heating.

A still further object is to provide a novel lining machine for the direct application of material which may be pre-mixed at a distance from the machine.

These and other objects will be apparent from the drawings and the following description. Referring to the drawings:

FIG. 1 is a sectional elevational view of apparatus embodying one form of the invention shown in place in a pipe to be lined;

FIG. 2 is a sectional view on line 2—2 of FIG. 1;

FIG. 3 is an enlarged sectional view on line 3—3 of FIG. 1;

FIG. 4 is a fragmentary central longitudinal sectional view of a modified form of the machine of FIG. 1;

FIG. 5 is a fragmentary elevational view of the applicator head of FIG. 4;

FIG. 6 is a view similar to FIG. 1 but showing a modified lining machine; and

FIG. 7 is a cross sectional view on line 7—7 of FIG. 6.

More particularly describing the invention, referring first to FIGS. 1 to 3, I show a lining machine 10 disposed in a pipeline 11 and adapted to be advanced by a cable, not shown, which is attached to an eye bracket 12 on a fitting 13 at the forward end of the machine, such cable being normally attached and wound upon a winch (not shown) at the ground level at some distance from the machine.

The machine includes a motor 14 and gear reduction unit 15. The motor may be either electric or pneumatic and a fitting 16, which is hollow, may be used for attaching the appropriate cable or air line as the case may be. A plurality of spring fingers 17 serve to center the machine in the pipe.

The lining machine includes a tubular housing or casing member 18 which is internally threaded and mounted on the threaded end 19 of the unit 15. A power shaft 20 driven by the motor extends into the interior of a chamber 21 defined by the casing member 18 and serves to drive a mixer shaft 23 which is journaled in a bearing 24 mounted in the housing against a shoulder 25. Seals 26 and 27 are provided on opposite sides of the bearing. The mixer shaft extends forwardly of the casing member into a mixing chamber 28 formed in part by housing 18 and by an extension 30 which threads onto the end of the housing member. The mixer shaft is provided with a plurality of vanes or blades 31 which are helically disposed. These are shown as part of a continuous helix interrupted by axial slots 32, but this construction is not essential.

Leading to the mixing chamber 28 are two inlet passages, 33 and 34, each of which is fitted with a forwardly extending tube, these being designated 35 and 36, respectively. The forward ends of the tubes (not shown) terminate a short distance ahead of the fitting 17 and are intended and adapted for the attachment of material supply hoses (not shown) which would lead to the surface of the ground or other appropriate place where the supply of material is located.

Rearwardly of the mixing chamber we provide means for distributing and smoothing or troweling a layer of the lining material 38, which issues from the mixing chamber through holes 39, on the inner surface of the pipe. This means includes a flared tube 40 mounted on member 30 and a material-retaining member 41 of flexible and resilient material, such as rubber reinforced with fabric or suitable fibers which is adapted to fit snugly against the inner surface of the pipe, the periphery 42 being beveled for that purpose.

Spaced rearwardly of member 41 we provide a trailing spreader which includes a nose section 44 that is connected to the rear wall 45 of member 30 by means of a ball-and-socket joint 46. Trailing rearwardly of the nose section are a plurality of over-lapping leaves 48 of sheet metal which together define a frusto-conical section 49 adapted to spread and thin the lining material to the desired coating thickness. The individual leaves are attached to the nose member 44 at their forward ends by means of bolts 50 which are provided with springs 51 inside the nose and nuts 52 so that there is considerable flexibility at the connection.

The leaves are urged outwardly by a coil spring 53 in the shape of a ring which is positioned between retaining brackets 54 and 55 on the individual leaves. The expansion of the assembly is limited by rings 56 connected to eyes 57 of adjacent leaves.

In the operation of the machine thus far described, the lining machine is placed in the pipe to be lined and connected by a cable to a winch or other means for drawing the machine through the pipe. The inlet pipes 35 and 36 are connected to supply hoses leading to the source of the material to be lined and suitable pump means is provided for forcing the material through the hoses to the machine.

Where the material is of a type which sets or hardens very quickly once all the ingredients have been combined, the material is kept divided at the surface so that some of the ingredients enter the machine through tube 35 and the remainder through tube 36 from which they pass into the mixing chamber 28 where they are combined and mixed and substantially immediately discharged through the openings 39. As the machine advances in the direction of the arrow 60 the material 38 issues through the annular space 61, 62, being discharged ultimately by the spreader at the trailing edge 63 thereof in a thin coating 38'. The rate of travel of the machine is adjusted to the volume output of the material pump in order to place the desired thickness of lining on the pipe wall.

Referring now to FIGS. 4 and 5, we show a special head 70 for use where the material is applied by centrifugal force, or in other words flung against the inner wall of the pipe, and where the material must be heated. In FIG. 4 the lining machine is essentially the same as that used in FIG. 1, except that the head 70 replaces the material spreading and troweling means. The head 70 comprises a body 71 having an internal bore 72 to receive the end of an extension 30A on the body 18 of the machine. The head is also provided with a counterbore 74 at its forward end and with an enlarged annular chamber 75 at its trailing end. The latter receives the material to be lined from the mixing chamber and the material then escapes through a plurality of passages 76 leading to the periphery of the head. The latter is carried upon a special or long mixer shaft 23A and thus rotates with it so that the material is discharged by the action of centrifugal force.

Member 30A is fitted with a ring 78 of electrical insulation material which carries two collector rings 80, and these may be provided with suitable electric conductors adapted to lead to a source of electric current. The head contains brushes 81 which contact the respective rings in order to furnish current to one or more electric heater elements 82 in the body of the device.

Referring now to FIGS. 6 and 7, we show a form of lining machine which is adapted for use where the material to be lined is not particularly quick-setting or quick-hardening and thus may be pumped a considerable distance through a conduit 90 to the machine without danger of hardening or setting before it is applied to the pipe. This machine includes a tubular main body 91 having spring fingers 92 adapted to center it in the pipe 11. Coupling means 93 is provided at the forward end of the tubular body to attach the supply hose or conduit 90 which leads from the source of material. The device is propelled by means of a cable 94 attached to a ring 95.

The trailing end of the body is fitted with a retaining wall 97 which is mounted in an annular channel 98. The wall may be of reinforced rubber or the like and should firmly engage the inner surface of the pipe. A plurality of discharge openings 100 are provided in the rear wall 101 of the tubular body so that the material escapes rearwardly of the wall 97.

A ball-and-socket joint means 102 is mounted on the rear wall of the tubular body to support a spreader assembly designated generally by numeral 104. This comprises a nose section 105 made up of sheet metal and having a central fixture 106 of frusto-conical form and a sheet metal body 107' bolted thereto and extending rearwardly thereof. The latter includes a forward section 107 which is relatively steeply inclined and a rear section 108 which is much less steeply inclined. Mounted on the rear section are a plurality of sheet metal leaves 110 similar to the ones previously described for the machine shown in FIG. 1. These define a frusto-conical spreader section.

A feature of this particular spreader means is the provision of an adjustable spring means for urging the spreader leaves outwardly. This includes a rod 112 which is internally threaded at its forward end to mount on the threaded shank 113 of the ball portion of the ball-and-socket joint means. The trailing end portion of the rod is externally threaded at 114 for a substantial distance to accommodate a nut 115. The rod also has a collar 116 forming a stationary abutment. Between the nut and collar we provide a spring housing or retainer 118 which has a hub section 119 slideably receiving the rod, an intermediate wall 120 and a peripheral wall means 121 and 122 defining a cage or interrupted annular channel 123 for the reception of a coil spring 53A adapted to bear against the leaves. A spring 125 is positioned between collar 116 and the housing 118 and another spring 126 is positioned between it and the nut 115.

With the construction described the spring 53A can be caused to exert various degrees of pressure against the leaves by adjusting the position of the spring retainer 118 on the rod by turning nut 115. Also, springs 125 and 126 increase the flexibility of the device. In this form of the invention as the machine is advanced by pulling cable 94, the lining material 38A, which is pumped to the machine, passes through the body into the annular space 130 and is then spread and troweled into a thin coating on the pipe at the trailing edge of the spreader.

Although we have illustrated and described a preferred form of our invention, we contemplate that various changes and modifications can be made therein without departing from the invention, the scope of which is indicated by the following claims.

We claim:

1. A spreader for a pipelining machine having a housing through which the material is discharged, comprising a nose member adapted to be mounted in trailing relation to the housing, a frusto-conical spreader attached to said nose member and comprising a plurality of circumferentially overlapping leaves, a rod mounted on said nose member and extending rearwardly thereof and axially of said spreader, inside said leaves a spring housing adjustably mounted on said rod and providing an interrupted peripheral channel, and spring means in the form of a coil spring seated in said channel and extending circularly and bearing against said leaves in a radially outward direction.

2. A spreader for a pipelining machine having a housing through which the material is discharged, comprising a nose member adapted to be mounted in trailing relation to the housing, a frusto-conical spreader attached to said nose member and comprising a plurality of circumferentially overlapping leaves, a rod mounted on said nose member and extending rearwardly thereof and axially of said spreader, a spring housing mounted for axial movement on said rod, a stationary abutment on the rod, an adjustable abutment on the rod positionable at various distances from said stationary abutment, said spring housing being between said abutments, a coil spring on said rod between said stationary abutment and said spring housing, a coil spring on said rod between said adjustable abutment and said spring housing, and a coil spring disposed in the form of a ring carried by said spring housing and bearing against said leaves.

3. In a machine for lining pipelines with cement mortar or the like having a housing through which the lining material is discharged rearwardly as the machine is advanced, means for spreading and troweling the discharged lining material comprising a nose member mounted on said housing for limited universal movement relative thereto, a flexible annular baffle wall extending from said housing radially outward and rearward thereof and spaced forward of said nose member to define therewith an annular passage for the lining material, a frusto-conical spreader formed of a plurality of overlapping leaves flexibly attached to said nose member and extending rearwardly thereof, spring means mounted inside said spreader yieldably urging said leaves to expand, said spring means being a coil spring disposed in the form of a ring inside said leaves, and means for adjustably positioning said spring axially of the spreader.

References Cited

UNITED STATES PATENTS

| 2,297,163 | 9/1942 | Perkins | 25—38 |
| 2,555,377 | 6/1951 | Scott | 25—38 |
| 2,924,867 | 2/1960 | Perkins | 25—38 |
| 3,029,027 | 4/1962 | Gray | 118—306 |
| 3,135,629 | 6/1964 | McLean | 118—408 |

J. SPENCER OVERHOLSER, *Primary Examiner.*

R. D. BALDWIN, *Assistant Examiner.*